3,789,015
PROCESS FOR PRODUCING MICROCAPSULES
CONTAINING OILY HYDROPHOBIC LIQUID
Hiroharu Matsukawa, Keiso Saeki, and Shizuo Katayama, Fujinomiya, Japan, assignors to Fuji Photo Film Co., Ltd., Ashigara-shi, Kanagawa, Japan
No Drawing. Filed July 2, 1971, Ser. No. 159,518
Claims priority, application Japan, July 2, 1970, 45/57,909
Int. Cl. B01j 13/02; B44d 1/02, 1/44
U.S. Cl. 252—316                              9 Claims

ABSTRACT OF THE DISCLOSURE

The present invention relates to a process for producing microcapsules containing oily hydrophobic liquid. The process is characterized by adding a shock-preventing agent and a compound having at least one —COOX group at the repeating unit thereof, wherein X is hydrogen, alkali metal or ammonium, to the system at a temperature lower than the gelling point of gelatin in the hardening pretreatment of the complex coacervation utilizing gelatin as at least one of the hydrophilic colloids, whereby the elevation of viscosity due to the reaction of gelatin and an aldehyde hardening agent is prevented and the hardening pretreatment can be rapidly carried out.

---

In the specification, "hardening pretreatment" means an operation to convert the pH of the system rapidly into alkalinity for the purpose of accelerating the reaction of gelatin and the aldehyde type hardening agent. And "shock" represents the phenomenon wherein, in carrying out the hardening pretreatment of a coacervate containing an oily liquid, the viscosity rises rapidly when the pH of the system is about pH 6 to pH 9 in the system (near the isoelectric point of gelatin), i.e. when a rapid increase of viscosity results in adhesion or cohesion of microcapsules.

Hitherto, processes of producing a microcapsule containing a hydrophobic oil droplet have been described in U.S. Pat. No. 2,800,457 and Japanese patent publication No. 3,875/62.

The process according to U.S. Pat. No. 2,800,457 comprises the steps of:

(1) emulsifying a water-immiscible oil in an aqueous solution of hydrophilic colloid ionizable in water to prepare first sol (emulsifying step), (2) mixing an aqueous solution of hydrophilic colloid ionizable in water and having the opposite electric charge to the colloid of the first sol with the emulsion prepared in the step (1) (second sol) and adding water thereto and/or adjusting the pH thereof to cause coacervation, thus obtaining coacervates wherein the complex colloid is fixed to the individual oil drops (coacervation step), (3) cooling the coacervates to cause gelation thereof (gelling step), and (4) adding a hardening agent thereto and adjusting the pH of the system to an alkalinity (hardening pretreatment).

Also, the process of Japanese patent publication No. 3,875/62 comprises, in the step (1) of U.S. Pat. No. 2,800,457, i.e. the emulsification step, adding a thickener such as acacia, tragacanth gum, methyl cellulose, carboxymethyl cellulose, polyglycol, magnesium aluminum silicates, and the like so as to accumulate sufficiently the hydrophilic colloid round oil drops. In this procedure, the effect of the thickener is to improve the surface properties of the emulsion to be microencapsulated.

Microcapsules containing an oily hydrophobic liquid prepared by these processes are grape-bunch shaped, polynuclear microcapsules; in addition, the processes are complicated and require a long time for the production of the microcapsule because they require a long continuation (overnight) of stirring the system. The stirring is done at such a temperature that coacervates are maintained in the gel state in an acidic condition, while in the presence of a hardening agent of a hardening pretreatment, by adding dropwise 2–5% of alkaline solution thereto over a long time after diluting the system greatly.

If an alkali is added without diluting the solution, the viscosity elevates at higher than pH 6, thereby not only setting the capsule but also forming uneven capsules having a diameter of 200 microns to 5 millimeters.

The aggregation of microcapsules due to high viscosity is more remarkable as the concentration of colloid for the coacervation is increased, when the pH of the system for the coacervation is out of the suitable range and when a rapid adjustment of the system to the alkali side is made. Therefore, the dilution of gelatin for carrying out coacervation has been more than 50 cc. of water per 1 g. of gelatin.

An object of this invention is to provide a process for producing microcapsules containing a hydrophobic oily liquid without increasing the viscosity of the system in the hardening pretreatment.

Another object of the invention is to provide a process for producing microcapsules in a short time in high concentration of gelatin.

Still another object of the invention is to provide a process for changing a system to the alkali side for the hardening pretreatment in a short time without elevation of the viscosity and at the same time performing the hardening pretreatment for the coacervation at a higher gelatin concentration.

The inventors have previously proposed a process of conducting rapidly the hardening pretreatment by adding an anti-shock agent such as carboxymethyl cellulose to an oil-containing coacervate to be prehardened, whereby elevation of the viscosity is prevented and hence microcapsules are not aggregated.

According to the foregoing process, the aggregation of microcapsules due to the elevation of viscosity is prevented and microcapsules having good heat resistance and desirable particle sizes ranging from single nucleus capsules to polynuclear capsules are obtained. According to the process, aggregation of the system is not caused even if the hardening pretreatment is conducted at a high concentration of gelatin for the coacervation, for example, 1 g. of gelatin in 32 cc. of water.

An object of the present invention is to provide a process for producing microcapsules, whereby the shock-preventing activity is even more improved, by using an aqueous solution containing, together with the shock-preventing agent, a compound represented by one of the following general formulae:

(I)
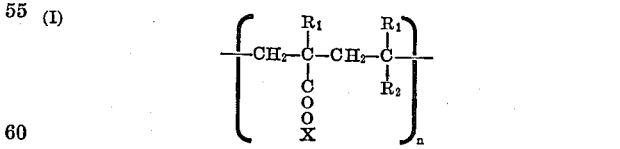

wherein $R_1$ is H or methyl; $R_2$ is halogen, COR or COOR; R is H, alkyl or aryl; and X is H, alkali metal or ammonium; or (II)
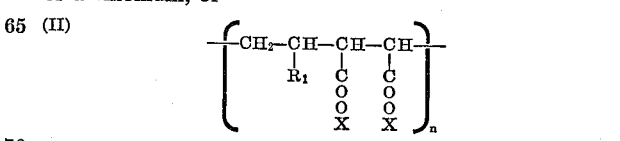

wherein $R_1$ is halogen, COR, H, CN, alkyl or aryl; R is H, alkyl or aryl; and X is H, alkali metal or ammonium.

If added alone to the system, an aqueous solution of the foregoing compound acts as an aggregating agent by causing the elevation of viscosity. However, when it is used together with a shock-preventing agent, synergistic effects are generated; that is, elevation of viscosity is more reduced in the hardening pretreatment where the two compounds are used then with a system containing a single shock-preventing agent, therefore, alkali can be rapidly added to the system for changing the pH of the system in a shorter time and the process becomes more stable.

The other object of the present invention is to effect the coacervation even in the case of a higher gelatin concentration and to prevent the elevation of viscosity during the hardening pretreatment.

According to the process of the present invention, the water content necessary for effecting the coacervation may possibly be used at a rate down to 27 cc. per 1 g. of gelatin.

Embodiments of the compound having at least one —COOX group in the repeating structural unit thereof include maleic anhydride copolymers, such as a copolymer of styrene with maleic anhydride, a copolymer of polyethylene with maleic anhydride, a copolymer of methyl vinyl ether with maleic anhydride, a copolymer of vinyl acetate with maleic anhydride, and the like, which are hydrolyzed at least over 60%, and acrylic or methacrylic polymers or copolymers, such as a polyacrylic acid, a copolymer of vinyl acetate with acrylic acid, a copolymer of vinyl alcohol with acrylic acid, a copolymer of methyl alrylate with acrylic acid, a copolymer of methyl methacrylate with acrylic acid, a copolymer of acrylamide with acrylic acid, a copolymer of vinyl pyrrolidone with acrylic acid, a copolymer of styrene with acrylic acid, a copolymer of vinyl chloride with acrylic acid, and the like. In the case of the copolymers, they may preferably be those of which the copolymerization ratio of acrylic acid or methacylic acid is at least 70%. The preferred homopolymers or copolymers have about 5,000 to about 300,000 average molecular weight, which is technically well-known and easily synthesized or commercially available.

The general process for producing the microcapsule according to the present invention will be performed by the following steps:

1. Dispersing of hydrophobic fine powder in an aqueous solution containing at least one kind of high polymer electrolyte colloid or emulsifying an oily hydrophobic liquid therein (dispersing and emulsifying step);
2. Diluting the dispersion or the emulsion obtained in the first step and adjusting the pH (coacervation process); in this case, if necessary, a high polymer electrolyte colloid solution is added thereto;
3. Cooling to gel the coacervate (cooling step);
4. Adding a hardening agent (hardening pretreatment);
5. Adding a shock-preventing agent and a compound of the present invention (hardening pretreatment);
6. Adjusting pH of the system to an alkalinity (hardening pretreatment); and
7. Elevating temperature of the system (hardening step).

In the above steps, the order of the hardening pretreatment steps of 4, 5 and 6 can be changed. As the shock-preventing agents there are, for example, a cellulose derivative having an anionic functional group, a starch derivative having an anionic functional group, pectin, pectinic acid, vinylbenzenesulfonic copolymer, acrylic copolymer, naphthalene-sulfonic acid-formalin condensate, nucleic acid, polyamino acid and polyethylene oxide, and the like.

The quantity of the shock-preventing agent has generally been more than ⅛ by weight based on the weight of dried gelatin used in the initiation of the steps, but according to the present invention, it is possible to decrease the amount to 1/12 by weight.

The preferred quantity of a compound having at least one —COOX group in the repeating structural unit thereof is generally 1/100 to ⅕ by weight based on the gelatin; it is generally decided, however, according to kind of the compound and of the shock-preventing agent or its quantity. Thus, for example, in the combination of sodium carboxymethyl cellulose (viscosity: 15 cp. in 2% aqueous solution at 25° C.; degree of etherification: 0.78) as the shock-preventing agent with polyacrylic acid as the above compound, the quantity of the polyacrylic acid is 1/100 to 1/10 by weight when the ratio of sodium carboxymethyl cellulose to gelatin is ⅛ by weight; in the combination of sodium salt of sulfated starch (viscosity: 34 cp. in 2% aqueous solution at 25° C.; degree of esterification: 0.54) as the shock-preventing agent with Springset 500 (trade name of copolymer of styrene with maleic anhydride manufactured by Monsanto Co.), the quantity of the latter is 1/100 to 1/15 by weight when the ratio of former to gelatin is ¼ by weight.

According to the present invention, the microcapsules can be practically produced by causing a complex coacervation by dilution of a hydrophilic high molecular colloid or colloids and/or by adjustment of the pH. That is, the procedure of forming the coacervate depending upon liquid-liquid phase separation can be basically conducted by the treatment that, in combination with two or more kinds of hydrophilic colloid sols, a phase abounding in the colloid is separated from a phase lacking in the colloid. In this case, the coacervate contains at least two kinds of hydrophilic colloids having electric charges opposite to each other, at least one of which is gelable.

As the hydrophilic colloids, there are, for example, gelatin casein, alginate, gum arabic, carrageenan, styrene-maleic anhydride copolymer, methylvinyl ether-maleic anhydride copolymer, and the like.

As the nuclei to be encapsulated, there are, for example, natural mineral oils, animal oils, vegetable oils, synthetic oils and other fine hydrophobic fine powders.

For the purpose of emulsifying an oily hydrophobic liquid as the nuclei in water, the use of an anionic or a cationic surfactant is desirable owing to their effective prevention of forming water in oil type emulsion. By the dilution of the emulsion with water and the pH adjustment, the coacervates are deposited around the emulsified oil. At that time, to prepare mono nucleus capsules, conditions insufficient in the coacervation may be settled as follows:

1. Making the quantity of water used for dilution less;
2. Shifting the pH adjustment from a value which yields the maximum coacervates;
3. Varying the colloid ratio; and
4. Adding an inorganic or organic metal salt thereto.

Among these operations, an employment of operation (1) or (2) is sufficiently successful for the purpose of obtaining the single nucleus capsule; in this case, the possible variation of the particle size of capsule formed is achieved by establishing a coacervation condition sufficient more than for mono nucleus capsules.

The coacervates deposited around the oil droplets after the process of causing coacervation are cooled to gel them. Then an aldehyde such as formaldehyde is added and the pH of the system is adjusted to alkalinity, whereby the walls of microcapsules are hardened. If a shock-preventing agent is not added in the hardening pretreatment under insufficient conditions for coacervation, the microcapsules are aggregated. In general, the solution of which pH is adjusted to an alkalinity is subsequently heated to proceed hardening of the capsule wall. Said shock-preventing agent and said compound having —COOX group may preferably be added at a temperature less than the gel point of said wall. They may be added simultaneously or individually.

According to the process of the present invention, mono nucleus microcapsules are rapidly and stably produced by using gelatin as at least one kind of colloid for coacervation. The thus obtained microcapsules can be useful for various purposes. For example, when the microcapsules are coated on a paper for a pressure-sensitive recording paper and contacted with a clay-coated paper, fog caused prior to use is reduced and images formed by pressurizing the sheets are more clear. Also, since the classification of microcapsules owing to air pressure in case of the air-knife coating is reduced, coating properties of capsule-coating compositions are improved and therefore the microcapsules are suitably coated at high speed.

The following examples will serve to set forth more specifically the present invention without limiting it to examples themselves. The term "part" used in the examples means "part by weight."

The heat-resistance test of capsules in the examples was carried out by storing a coated paper, which was obtained by dissolving a colorless basic dye in an oil droplet at a rate of 2% to the oil droplet and applying the formed capsules to a base paper, in a hot-air dryer, and evaluating the degree that a clay-coated paper was developed when the surface of the capsule-coated paper and the surface of clay-coated paper were superposed.

The typical preparation of the clay-coated paper to be used was the following process:

Into 300 parts of water containing 5 parts of 40% aqueous caustic soda solution, 100 parts of active clay (manufactured by Mizusawa Kagaku K.K.) was dispersed by means of a homogenizer, than 40 parts of styrene-butadiene latex (trade name: Dow Latex 636, manufactured by Dow Chemical Co.) was added thereto. The resulting composition was applied to a base paper of 5 g./m.² in a proportion of 12 g./m.² (as solid content) by means of an air-knife.

EXAMPLE 1

In 30 parts of water at 35° C., 6 parts of acid-treated gelatin having an isoelectric point of 8.2 and 6 parts of gum arabic were dissolved. Into the solution, 25 parts of chlorinated diphenyl dissolved in 20% of crystal violet lactone (hereinafter referred to as C.V.L.) was emulsified while the system was stirred violently to form an oil-in-water type emulsion: when the particle size of the oil droplets became 10 to 15μ, the stirring was stopped to complete the emulsification. Thereafter, said emulsion was poured into 190 parts of warm water at 35° C. and stirred for 5 minutes. To the emulsion, 50% acetic acid was added dropwise while stirring the system to adjust the pH to 4.5; then the colloid deposited around the oil droplets was gelled by cooling the outside of the vessel while stirring. Thereafter, 3.0 parts of 37% formalin solution, 30 parts of 5% aqueous solution of sodium carboxymethyl cellulose (hereinafter referred to a CMC solution, degree of etherification: 0.75, viscosity in 2% aqueous solution at 25° C.: 16 cp.) and 0.4 part of polyacrylic acid (trade name: Aron A–10 H, solid content: 25%, intrinsic viscosity: 0.08, manufactured by Toa Gosei Chemical Co., Ltd.) were added thereto under stirring when the system temperature decreased to 8° C. After dispersing the system for 3 minutes, 10% aqueous solution of caustic soda was added dropwise thereto to adjust the pH to an alkalinity, whereby the pH became 10.5 in 5 minutes. The solution was elevated to 40° C. over 20 minutes to obtain high heat resistant microcapsules containing chlorinated diphenyl solution of C.V.L.

In order to show that the formation of capsules according to the present invention was very stable, there is provided below comparative results showing the viscosity behaviors during changing the pH and sizes of the capsules formed in (1) Example 1, (2) Comparative Example 1, a system like Example 1 except that CMC and polyacrylic acid are omitted and (3) Comparative Example 2, a system like Example 1 except that CMC is omitted.

COMPARISONS OF VISCOSITY BEHAVIOR AND SIZE OF CAPSULE FORMED

| | Example 1 | Comparative Ex. 1 | Comparative Ex. 2 |
|---|---|---|---|
| Viscosity at 10° C., cp | 85 | 85 | 85 |
| Viscosity at adding shock-preventing agent, cp | ¹ 42 | ² 68 | ³ 54 |
| Viscosity at— | | | |
| pH 6.0, cp | 46 | 345 | 74 |
| pH 8.0, cp | 87 | (⁴) | 170 |
| pH 10.0, cp | 46 | | 60 |
| Size of capsule formed, μ | 10–20 | ⁵ 50 | 10–20 |

¹ Adding CMC and polyacrylic acid to the system.
² Adding water at the same quantity as CMC solution used in Example 1.
³ Adding only CMC solution.
⁴ Several thousand cp./coagulation.
⁵ Several thousands microns.

NOTE.—C.P. is unit, centipoise showing viscosity obtained in measuring by means of B-type rotary viscosimeter (manufactured by Tokyo Keiki Seizosho Co. Ltd.).

Also, a coating paper, prepared by applying the microcapsule prepared in Example 1 to a base paper of 40 g./m.² in a proportion of 4 g./m.² of the chlorinated diphenyl solution, was superposed on clay-coated paper and pressurized by means of a typewriter to form a clear blue image. The same coating paper, after being subjected to a heat-resisting test in an air dryer at 100° C. for 10 hours was superposed on the clay-coated paper and typewritten; the density of the image developed was not lower than that of the one prior to the heat-resisting test. From the foregoing results, said capsules were confirmed to be excellent in heat resistance.

EXAMPLE 2

In 30 parts of water at 35° C., 6 parts of acid-treated gelatin having an isoelectric point of 8.5 was dissolved. Into the solution, 30 parts of chlorinated diphenyl dissolved in 2.0% of 3,3 - bis(p - dimethylaminophenyl) phthalide (usually called "Malachite Green Lactone") was emulsified while stirring the system violently to form an oil-in-water type emulsion. When particle size of the oil droplets became 15 to 20μ, the stirring was stopped; then said emulsion was poured into 4 parts of gum arabic dissolved in 160 parts of warm water at 35° C. Thereafter, 10% hydrochloric acid was added dropwise thereto while stirring the system to adjust the pH to 4.4. The subsequent steps were conducted while stirring the system.

The outside of the vessel was cooled to gel colloid deposited around the oil droplets. When the temperature lowered to 17° C., 2.5 parts of 37% formalin solution was added; and further, when it became 8° C., 30 parts of 5% aqueous solution of carboxymethylhydroxyethyl cellulose (hereinafter referred to as CMHEC, degree of etherification: 0.89, viscosity in 1% aqueous solution at 25° C.: 125 cp.) and 10 parts of 2% aqueous solution of methylvinyl ether-maleic anhydride copolymer (trade name: Gantrez AN 119, manufactured by General Aniline Film Corp.) were added thereto. Stirring was continued for 2 minutes, and the pH was adjusted by dropping in 25% aqueous caustic soda solution over 3 minutes. Thereafter, the resulting mixture was heated to 40° C. to harden the wall.

The microcapsules formed were applied to a base paper of 40 g./m.² in a proportion of 6.5 (as solid content) to obtain a coated paper. Said capsule-coated paper and clay-coated paper were superposed and written on with a pencil to obtain a clear light-blue image. The capsule-coated paper, after storing in a dryer at 100° C. for 10 hours, and the clay-coated paper were similarly superposed and written on; the color density was not reduced.

For a comparison of the stability of the viscosity behavior in the process, there are provided Comparative Examples 3 and 4 which correspond to the system of Example 2 without addition of CMHEC and PVM/MA and without addition of CMHEC, respectively.

|  | Ex. 2 CMHEC+ PVM/MA system | Comparative Ex. 3 No addition | Comparative Ex. 4 (CMHEC system) |
| --- | --- | --- | --- |
| Viscosity at 10° C., cp | 36 | 36 | 36 |
| Viscosity after adding shock-preventing agent, cp | 24 | ¹ 32 | 30 |
| Viscosity at— |  |  |  |
| pH 6.0, cp | 48 | 243 | 84 |
| pH 8.0, cp | 74 | (²) | 123 |
| pH 10.0, cp | 51 | (²) | 82 |

¹ Additional quantity of only water used for dissolving the shock-preventing agent.
² Aggregation.

EXAMPLE 3

Example 1 was repeated except that 30 parts of 5% CMC solution was replaced by 25 parts of 5% sulfated cellulose solution (degree of esterification: 0.62, viscosity in 2% aqueous solution at 25° C.: 24 cp.) to obtain substantially single-nucleus microcapsules having an excellent heat resistance.

As Comparative Example 5, there was compared to the viscosity of Example 3 the viscosity of the same system, but using only a solution of sulfated cellulose as the shock-preventing agent.

|  | Example 3 | Comparative Ex. 5 |
| --- | --- | --- |
| Viscosity after adding a shock-preventing agent, cp | 49 | 64 |
| Viscosity at— |  |  |
| pH 6.0, cp | 54 | 95 |
| pH 8.0, cp | 62 | 195 |
| pH 10.0, cp | 42 | 75 |

EXAMPLE 4

Example 1 was repeated except that the 30 parts of 5% CMC solution was replaced by 20 parts of 10% carboxymethyl starch (degree of etherification: 0.72, viscosity at 20° C.: 45 cp.) to obtain substantially single-nucleus microcapsules having excellent heat resistance.

As Comparative Example 6, there was compared to the viscosity of Example 4 the viscosity of the system but using only a solution of carboxymethyl starch.

|  | Example 4 | Comparative Ex. 6 |
| --- | --- | --- |
| Viscosity after adding a shock-preventing agent, cp | 52 | 65 |
| Viscosity at— |  |  |
| pH 6.0, cp | 69 | 84 |
| pH 8.0, cp | 81 | 130 |
| pH 10.0, cp | 58 | 74 |

EXAMPLE 5

Example 2 was repeated except that the 30 parts of 5% CMHEC solution and the 10 parts of 2% aqueous Gantrez AN 119 solution were replaced by 30 parts of 5% potassium vinylbenzene-sulfonate-acryloylmorpholine copolymer (mole percent of potassium vinylbenzenesulfonate occupied in the copolymer: 63.9%, intrinsic viscosity at 30° C. in 1 N NaNO₃ solution (1 g./100 ml.): 0.740) and 10 parts of 2% aqueous solution of styrene-maleic anhydride copolymer (trade name: Scripset 500, manufactured by Monsanto Chemical Co.), respectively.

As Comparative Example 7, there also was compared to the viscosity of Example 5 the viscosity of the above system but using only potassium vinylbenzenesulfonate-acryloylmorpholine copolymer as the shock-preventing agent.

|  | Example 5 | Comparative Ex. 7 |
| --- | --- | --- |
| Viscosity after adding a shock-preventing agent, cp | 35 | 54 |
| Viscosity at— |  |  |
| pH 6.0, cp | 41 | 74 |
| pH 8.0, cp | 63 | 146 |
| pH 10.0, cp | 32 | 59 |

EXAMPLE 6

In 30 parts of water at 35° C., 6 parts of acid-treated gelatin having an isoelectric point of 8.8, 3 parts of gum arabic and 2 parts of carrageenan were dissolved. Into this solution, 30 parts of lemon oil was emulsified while stirring the system violently to produce an oil-in-water-type emulsion containing oil droplets of 20 to 30μ. Then the resulting emulsion was poured into 180 parts of warm water at 35° C., and 5.0% succinic acid was added dropwise while stirring to adjust the pH to 4.0. The vessel was cooled while stirring of the system continued to gel the colloid deposited around the oil droplets. When the temperature of the solution reached 17° C., 20 parts of 10% aqueous pectin solution was added thereto, and when the temperature was lowered to 12° C., 2 parts of 37% aqueous formalin solution was added, and further, when it became 8° C., 5 parts of vinyl-acetate-maleic anhydride copolymer (trade name: Tamanori NH, viscosity at 25° C. in 20.5% of solid content 250 cp., manufactured by Arakawa Rinsan Kagaku Co., Ltd.) was added thereto. After stirring the mixture for 2 minutes, 10% aqueous caustic soda solution was added dropwise thereto to adjust the pH to 9.0. In this case, the dropping time was 5 minutes.

Then the resulting mixture was elevated to 40° C. to harden the wall, whereby microcapsules containing lemon oil, of which more than 95% were single-nucleus, were obtained.

As Comparative Example 8, there was compared the viscosity of the system of Example 6 but without addition of Tamanori NH.

|  | Example 6 | Comparative Ex. 8 |
| --- | --- | --- |
| Viscosity after adding a shock-preventing agent, cp | 74 | 85 |
| Viscosity at— |  |  |
| pH 6.0, cp | 84 | 98 |
| pH 8.0, cp | 115 | 170 |
| pH 10.0, cp | 64 | 89 |

What is claimed is:

1. In a process for producing microcapsules containing an oily hydrophobic liquid by
   (1) dispersing a hydrophobic fine powder in an aqueous solution containing at least one type of hydrophilic colloid or emulsifying an oily hydrophobic liquid therein;
   (2) diluting the dispersion or the emulsion obtained in step (1) and adjusting the pH, and optionally, having present therein, a hydrophilic colloid;
   (3) cooling to gel the coacervate obtained from step (2);
   (4) adding a hardening agent;
   (5) adding a shock-preventing agent, in an amount effective to prevent the increase of viscosity when the pH of the system is adjusted to alkalinity;
   (6) adjusting the pH of the system to alkalinity; and
   (7) elevating the temperature of the system, wherein the order of the hardening pretreatment steps of (4), (5), and (6) can be altered except that the order of step (5) is after completion of both (4) and (6), the improvement which comprises:

adding, in an amount effective to reduce the elevation of viscosity during the hardening pre-treatment, a homopolymer or copolymer having a repeating structure of aliphatic chain units containing at least one —COOX group, wherein X represents a member selected from the group consisting of a hydrogen atom, an alkali metal, and an ammonium radical per unit in combination with said shock-preventing agent, prior to step (7) and at a temperature lower than the gelling point of said hydrophilic colloid, said homopolymer or copolymer and said shock-preventing agent being different from each other, said shock-preventing agent being a member selected from the group consisting of a cellulose derivative having an anionic functional group, a starch derivative having an anionic functional group, pectin, pectinic acid, a vinylbenzene sulphonic acid copolymer, an acrylic copolymer, a naphthalene sulphonic acid-formalin condensate, a nucleic acid, a polyamino acid, and polyethylene oxide, and said homopolymer or copolymer being a member selected from the group consisting of maleic anhydride copolymers, acrylic homopolymers, acrylic copolymers, methacrylic homopolymers, and methacrylic copolymers.

2. The process as claimed in claim 1 wherein said copolymer is represented by the following formula:

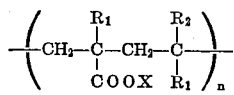

wherein $R_1$ is hydrogen atom or a methyl group, $R_2$ is a halogen atom, COR or COOR, R is a hydrogen atom, an alkyl group or an aryl group, X is a hydrogen atom, an alkali metal or an ammonium group, and $n$ is an integer.

3. The process as claimed in claim 1 wherein said copolymer is represented by the following formula:

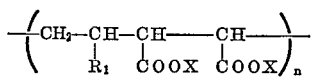

wherein $R_1$ is a halogen atom, COR, a hydrogen atom, a cyano group, an alkyl group or an aryl group; R is a hydrogen atom, an alkyl group or an aryl group; X is hydrogen, an alkali metal or ammonium group; and $n$ is an integer.

4. The process as claimed in claim 1 wherein said homopolymer or copolymer has a molecular weight of from 5,000–3,000,000.

5. The process as claimed in claim 1 wherein an amount of said homopolymer or copolymer is $\frac{1}{100}$ to $\frac{1}{3}$ by weight based on the colloid.

6. The process as claimed in claim 1 wherein at least one colloid is gelatin.

7. The process as claimed in claim 1 wherein at least one of said shock-preventing agent and said homopolymer or copolymer is in the form of an aqueous solution.

8. The process as claimed in claim 1, wherein said maleic anhydride copolymer is a member selected from the group consisting of a copolymer of styrene with maleic anhydride, a copolymer of polyethylene with maleic anhydride, a copolymer of methylvinyl ether with maleic anhydride, and a copolymer of vinyl acetate with maleic anhydride.

9. The process as claimed in claim 1, wherein said acrylic or methacrylic homopolymer or copolymer is a member selected from the group consisting of polyacrylic acid, a copolymer of vinyl acetate with acrylic acid, a copolymer of vinyl alcohol with acrylic acid, a copolymer of methylacrylate with acrylic acid, a copolymer of methylmethacrylate with acrylic acid, a copolymer of acrylamide with acrylic acid, a copolymer of vinyl pyrrolidone with acrylic acid, a copolymer of styrene with acrylic acid, and a copolymer of vinyl chloride with acrylic acid.

References Cited

UNITED STATES PATENTS

| | | | |
|---|---|---|---|
| 2,969,331 | 1/1961 | Brynko et al. | 252—316 |
| 3,069,370 | 12/1962 | Jensen et al. | 252—316 X |
| 3,494,872 | 2/1970 | Maierson et al. | 252—316 |

FOREIGN PATENTS

| | | | |
|---|---|---|---|
| 929,226 | 6/1963 | Great Britain | 252—316 |

RICHARD D. LOVERING, Primary Examiner

U.S. Cl. X.R.

99—140 R; 117—62.2, 100 A; 264—4